United States Patent
Chakravarty et al.

(10) Patent No.: US 11,662,741 B2
(45) Date of Patent: May 30, 2023

(54) VEHICLE VISUAL ODOMETRY

(71) Applicant: Ford Global Technologies, LLC, Dearborn, MI (US)

(72) Inventors: Punarjay Chakravarty, Campbell, CA (US); Bruno Sielly Jales Costa, Santa Clara, CA (US); Gintaras Vincent Puskorius, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 461 days.

(21) Appl. No.: 16/456,192

(22) Filed: Jun. 28, 2019

(65) Prior Publication Data

US 2020/0409385 A1    Dec. 31, 2020

(51) Int. Cl.
| | |
|---|---|
| *G05D 1/02* | (2020.01) |
| *G06N 3/08* | (2023.01) |
| *G05D 1/08* | (2006.01) |
| *G06V 10/82* | (2022.01) |
| *G06V 20/56* | (2022.01) |

(52) U.S. Cl.
CPC ......... *G05D 1/0253* (2013.01); *G05D 1/0891* (2013.01); *G06N 3/08* (2013.01); *G06V 10/82* (2022.01); *G06V 20/56* (2022.01); *G05D 2201/0213* (2013.01)

(58) Field of Classification Search
CPC .... G05D 1/0253; G05D 1/0891; G05D 1/021; G05D 1/0246; G05D 2201/0213; G06T 7/77; G06N 20/10; G06N 3/08; G06K 9/6212
See application file for complete search history.

(56) References Cited

U.S. PATENT DOCUMENTS

| | | | |
|---|---|---|---|
| 5,706,417 | A | 1/1998 | Adelson |
| 5,787,199 | A | 7/1998 | Lee |
| 6,580,812 | B1 | 6/2003 | Harrington |
| 6,956,469 | B2 | 10/2005 | Hirvonen et al. |
| 7,149,328 | B2 | 12/2006 | Kamijo et al. |

(Continued)

FOREIGN PATENT DOCUMENTS

| | | |
|---|---|---|
| CN | 102201121 A | 9/2011 |
| CN | 101582160 B | 9/2013 |

(Continued)

OTHER PUBLICATIONS

Yanpeng Cao, Vehicle Ego-Motion Estimation by using Pulse-Coupled Neural Network, 2007, University of Manchester (Year: 2007).*

(Continued)

*Primary Examiner* — Christian Chace
*Assistant Examiner* — Shayne M. Gilbertson
(74) *Attorney, Agent, or Firm* — Frank A. MacKenzie; Bejin Bieneman PLC

(57) ABSTRACT

A computer, including a processor and a memory, the memory including instructions to be executed by the processor to determine an eccentricity map based on video image data and determine vehicle motion data by processing the eccentricity map and two red, green, blue (RGB) video images with a deep neural network trained to output vehicle motion data in global coordinates. The instructions can further include instructions to operate a vehicle based on the vehicle motion data.

20 Claims, 6 Drawing Sheets

(56) References Cited

U.S. PATENT DOCUMENTS

| | | |
|---|---|---|
| 7,418,113 B2 | 8/2008 | Porikli et al. |
| 7,710,461 B2 | 5/2010 | Nagano et al. |
| 7,881,497 B2 | 2/2011 | Ganguli et al. |
| 7,920,959 B1 | 4/2011 | Williams |
| 8,094,943 B2 | 1/2012 | Eaton et al. |
| 8,120,661 B2 | 2/2012 | Rabinowitz et al. |
| 8,328,653 B2 | 12/2012 | Lock |
| 8,379,926 B2 | 2/2013 | Kanhere et al. |
| 8,611,593 B2 | 12/2013 | Chen et al. |
| 8,718,327 B2 | 5/2014 | Tong et al. |
| 8,947,529 B2 | 2/2015 | Strine et al. |
| 9,171,390 B2 | 10/2015 | Sumner et al. |
| 9,300,871 B2 | 3/2016 | Zhou et al. |
| 9,418,320 B2 | 8/2016 | Chang et al. |
| 9,542,626 B2 | 1/2017 | Martinson et al. |
| 9,558,424 B2 | 1/2017 | Ramalingam et al. |
| 9,665,804 B2 | 5/2017 | Sarkis et al. |
| 9,716,832 B2 | 7/2017 | Ryu et al. |
| 9,756,248 B1 | 9/2017 | Wu et al. |
| 9,804,713 B2 | 10/2017 | Guarneri et al. |
| 9,854,168 B2 | 12/2017 | Wu et al. |
| 10,055,850 B2 | 8/2018 | Piekniewski et al. |
| 10,535,127 B1* | 1/2020 | Simonson ............... G01S 13/90 |
| 10,705,525 B2* | 7/2020 | Smolyanskiy ....... B62D 15/025 |
| 10,769,799 B2 | 9/2020 | Jales Costa et al. |
| 11,253,953 B1 | 2/2022 | Lan et al. |
| 2002/0041339 A1 | 4/2002 | Diepold |
| 2004/0076324 A1* | 4/2004 | Burl ........................ G06T 7/246 |
| | | 382/153 |
| 2008/0195316 A1* | 8/2008 | Krishnaswamy .... G05D 1/0253 |
| | | 348/E5.066 |
| 2014/0218555 A1 | 8/2014 | Kuo et al. |
| 2015/0003676 A1 | 1/2015 | Kuchiki |
| 2015/0310274 A1* | 10/2015 | Shreve ...................... G06T 7/77 |
| | | 382/103 |
| 2015/0339589 A1 | 11/2015 | Fisher |
| 2016/0125245 A1* | 5/2016 | Saitwal ................... G06T 7/136 |
| | | 382/173 |
| 2016/0125621 A1* | 5/2016 | Saitwal ..................... G06T 7/90 |
| | | 382/165 |
| 2016/0173787 A1 | 6/2016 | Yun |
| 2016/0236790 A1 | 8/2016 | Knapp et al. |
| 2016/0292882 A1 | 10/2016 | Comport et al. |
| 2017/0053554 A1 | 2/2017 | Nalepka et al. |
| 2017/0053555 A1 | 2/2017 | Angel et al. |
| 2017/0206717 A1 | 7/2017 | Kühnapfel |
| 2017/0236252 A1 | 8/2017 | Nguyen et al. |
| 2017/0358119 A1 | 12/2017 | Forutanpour et al. |
| 2018/0024562 A1* | 1/2018 | Bellaiche ............. G05D 1/0253 |
| | | 701/26 |
| 2018/0218214 A1 | 8/2018 | Pestun et al. |
| 2019/0079535 A1* | 3/2019 | Zhu ......................... G06T 7/269 |
| 2019/0114491 A1 | 4/2019 | Takaki |
| 2019/0271767 A1 | 9/2019 | Keilaf et al. |
| 2019/0286153 A1* | 9/2019 | Rankawat ............... G06V 20/58 |
| 2020/0053286 A1 | 2/2020 | Corona et al. |
| 2020/0065663 A1 | 2/2020 | Singh et al. |
| 2020/0065978 A1 | 2/2020 | Jales Costa et al. |
| 2020/0065980 A1 | 2/2020 | Jales Costa et al. |
| 2020/0111358 A1 | 4/2020 | Parchami et al. |
| 2020/0116836 A1 | 4/2020 | Pacala et al. |
| 2020/0142421 A1* | 5/2020 | Palanisamy .......... G06N 3/0454 |
| 2020/0189573 A1 | 6/2020 | King et al. |
| 2020/0293064 A1* | 9/2020 | Wu ....................... G06K 9/6256 |
| 2020/0380763 A1* | 12/2020 | Abramov ............... G06N 3/088 |
| 2020/0394917 A1 | 12/2020 | Jales Costa et al. |
| 2020/0409385 A1 | 12/2020 | Chakravarty et al. |

FOREIGN PATENT DOCUMENTS

| | | |
|---|---|---|
| CN | 102592112 B | 1/2014 |
| CN | 103077531 B | 11/2015 |
| CN | 106952474 A | 7/2017 |
| CN | 108230367 A | 6/2018 |
| CN | 110737834 A | 1/2020 |
| CN | 110858316 A | 3/2020 |
| CN | 1119861128 A | 11/2020 |
| CN | 112146618 A | 12/2020 |
| DE | 102019122402 A1 | 2/2020 |
| DE | 102020113848 A1 | 11/2020 |
| WO | 2016108847 A1 | 7/2016 |
| WO | 2017206999 A1 | 12/2017 |
| WO | 2018170393 A2 | 9/2018 |

OTHER PUBLICATIONS

S. Sridhar, Vision Based Tunnel Detection For Driver Assitance System, 2014, Mando Softtech India Pvt. Ltd (Year: 2014).*

Hayakawa, Ego-motion and Surrounding Vehicle State Estimation Using a Monocular Camera, 2019, 2019 IEEE Intelligent Vehicles Symposium (Year: 2019).*

David Nister, et. al., "Visual Odometry for Ground Vehicle Applications", published in Journal of Field Robotics, Jan. 26, 2006 (35 pages).

The 20BN-jester Dataset V1, retrieved from Internet URL: https://20bn.com/datasets/jester (6 pages).

Notice of Allowance as issued for U.S. Appl. No. 16/421,563, filed May 24, 2019.

Angelov, "Outside the Box: An Alternative Data Analytics Frame-Work", Journal of Automation, Mobile Robotics & Intelligent Systems, Vo. 8, No. 2, 2014 (7 pages).

Wang, et al., "An Optimization Clustering Algorithm Based on Texture Feature Fusion for Color Image Segmentation", Algorithms, Jun. 2015, retrieved from Internet URL: https://www.researchgate.net/publication/277019137, pp. 234-247 (15 pages).

Chen, et al., "Object-Based Features for House Detection from RGB High-Resolution Images", MDPI Remote Sensing 2018, 10, 451, retrieved from Internet URL: www.mdpi.com/journal/remotesensing (24 pages).

Kim, J., et al., "Foreground Objects Detection by U-Net with Multiple Difference Images," Applied Sciences, Feb. 18, 2021, (19 pages).

Non-FInal Office Action for U.S. Appl. No. 16/155,048 dated Sep. 28, 2022.

Notice of Allowance for U.S. Appl. No. 16/437,292 dated Jul. 27, 2022.

Non-Final Office Action for U.S. Appl. No. 16/155,048, filed Oct. 9, 2018, as issued by the USPTO dated Jan. 31, 2023.

* cited by examiner

300

400

VEHICLE VISUAL ODOMETRY

BACKGROUND

Vehicles can be equipped with computing devices, networks, sensors and controllers to acquire information regarding the vehicle's environment and to operate the vehicle based on the information. Vehicle sensors can provide data concerning routes to be traveled and objects to be avoided in the vehicle's environment. Operation of the vehicle can rely upon acquiring accurate and timely information regarding objects in a vehicle's environment while the vehicle is being operated on a roadway.

DETAILED DESCRIPTION

Figure 1:
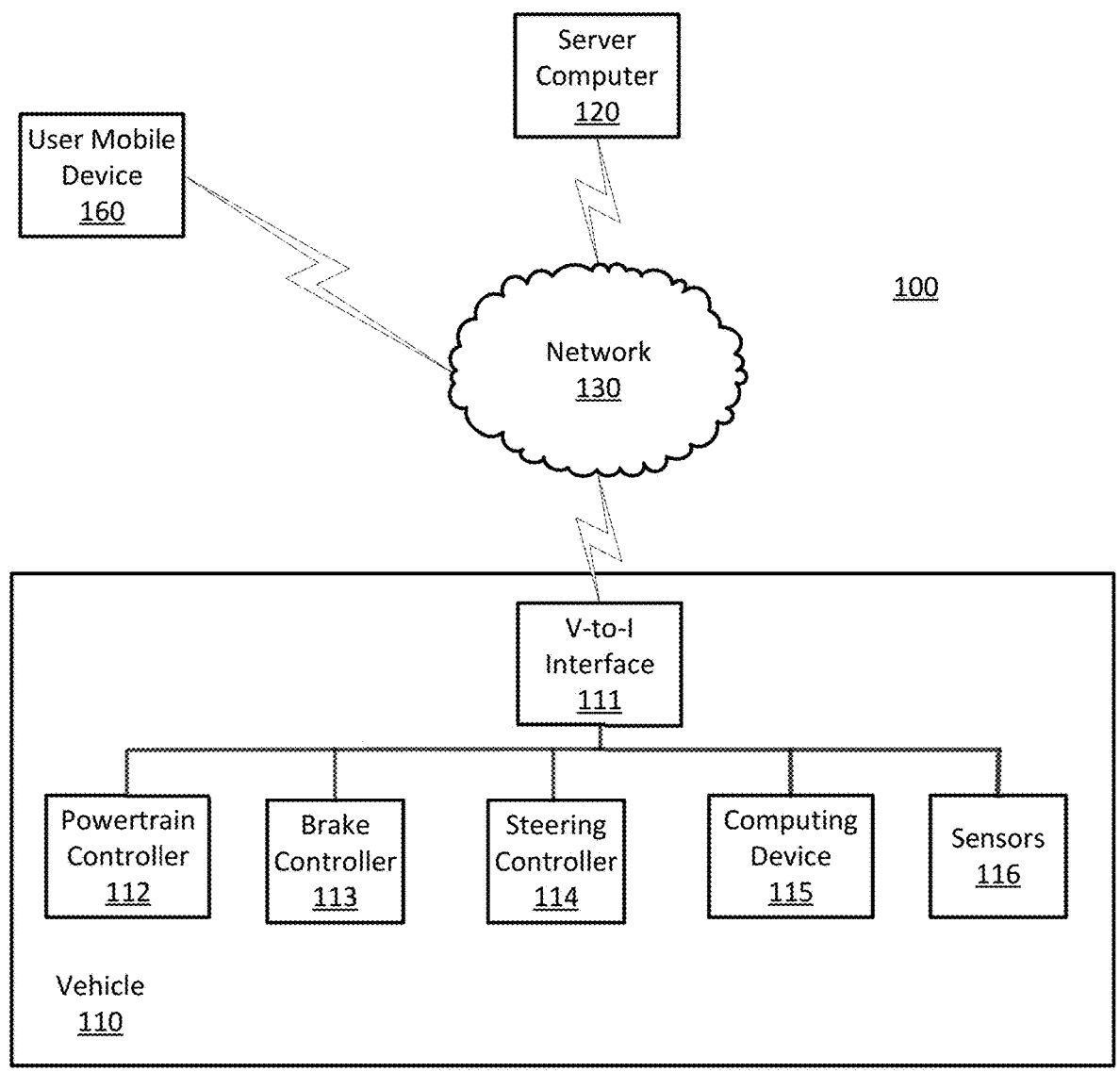
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of an information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle so as to travel along the path. The data regarding the external environment can include visual odometry, where visual odometry means determining vehicle motion data based on video stream data. Visual odometry can be used to determine a location and direction for a vehicle with respect to the real world environment around the vehicle. For example, visual odometry can be used to determine the location and direction of a vehicle with respect to a roadway upon which a vehicle is traveling. Visual odometry can be based on computationally intensive techniques including dense optical flow calculations. Techniques discussed herein improve determination of visual odometry data by using eccentricity calculations instead of dense optical flow calculations to reduce the number of calculations required to perform visual odometry by factors greater than 1000.

Disclosed herein is method including determining an eccentricity map based on video image data, determining vehicle motion data by processing the eccentricity map and two red, green, blue (RGB) video images with a deep neural network trained to output vehicle motion data in global coordinates and operating a vehicle based on the vehicle motion data. The two RGB video images can be acquired at a time step, where the time step is a small number of video frames. Vehicle motion data can include vehicle location, speed and direction with respect to an external environment of the vehicle. An eccentricity map can be determined by determining a per-pixel mean $\mu_k$ and a per-pixel variance $\sigma_k^2$ based on an exponential decay factor $\alpha$, wherein the eccentricity map measures the motion of objects, edges and surfaces in video stream data. The eccentricity map concatenating with the two RGB images as input channels to the deep neural network.

The concatenated eccentricity map and two RGB images can be processed using a plurality of convolutional layers to generate hidden variables corresponding to vehicle motion data. The hidden variables corresponding to vehicle motion data can be processed with a plurality of fully connected layers to generate x, y, and z location coordinates and roll, pitch, and yaw rotational coordinates. The deep neural network can be trained based on a training dataset including eccentricity maps, RGB images and vehicle motion ground truth in global coordinates. Vehicle motion ground truth can be generated based on processing dense optical flow images and corresponding RGB image pairs. The vehicle motion ground truth can be generated by solving simultaneous linear equations based on the dense optical flow images. The RGB video images can be acquired from a vehicle video sensor. The vehicle can be operated by determining a vehicle path based on the vehicle motion data. The vehicle can be operated along the vehicle path by controlling one or more of vehicle powertrain, vehicle steering, and vehicle brakes. The vehicle motion data can be determined for another vehicle.

Further disclosed is a computer readable medium, storing program instructions for executing some or all of the above method steps. Further disclosed is a computer programmed for executing some or all of the above method steps, including a computer apparatus, programmed to determine an eccentricity map based on video image data, determine vehicle motion data by processing the eccentricity map and two red, green, blue (RGB) video images with a deep neural network trained to output vehicle motion data in global coordinates and operate a vehicle based on the vehicle motion data. The two RGB video images can be acquired at a time step, where the time step is a small number of video frames. Vehicle motion data can include vehicle location, speed and direction with respect to an external environment of the vehicle. An eccentricity map can be determined by determining a per-pixel mean $\mu_k$ and a per-pixel variance $\sigma_k^2$ based on an exponential decay factor $\alpha$, wherein the eccentricity map measures the motion of objects, edges and surfaces in video stream data. The eccentricity map concatenating with the two RGB images as input channels to the deep neural network.

The computer can be further programmed to process the concatenated eccentricity map and two RGB images using a plurality of convolutional layers to generate hidden variables corresponding to vehicle motion data. The hidden variables corresponding to vehicle motion data can be processed with a plurality of fully connected layers to generate x, y, and z location coordinates and roll, pitch, and yaw rotational coordinates. The deep neural network can be trained based on a training dataset including eccentricity maps, RGB images and vehicle motion ground truth in global coordinates. Vehicle motion ground truth can be generated based on processing dense optical flow images and corresponding RGB image pairs. The vehicle motion ground truth can be generated by solving simultaneous linear equations based on the dense optical flow images. The RGB video images can be acquired from a vehicle video sensor. The vehicle can be operated by determining a vehicle path based on the vehicle motion data. The vehicle can be operated along the vehicle path by controlling one or more of vehicle powertrain, vehicle steering, and vehicle brakes. The vehicle motion data can be determined for another vehicle.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive information regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
FIG. 2 is a diagram of an example red, green, and blue (RGB) video image.

FIG. 2 is a diagram of an example red, green, and blue (RGB video image 200, rendered as a black and white line drawing to comply with Patent Office regulations. RGB video image 200 can be acquired by a video sensor included in a vehicle 110 as the vehicle 110 travels on a roadway. RGB video image 200 can be acquired by a computing device 115 in a vehicle 110 as a frame in a sequence of frames of RGB video images 200 referred to as video stream data. Video stream data can be processed by a computing device 115 to perform visual odometry, which can depend upon processing two or more RGB video images 200 acquired at different times. By determining changes in pixel data included in the RGB video images 200, computing device can determine the change in location and orientation of the video sensor and based on the time step between acquisitions of the RGB video images 200 determine the rate at which the video sensor is moving. In addition to RGB video images 200, visual odometry can be performed on grayscale video images, infrared video images or combinations of RGB, grayscale, and infrared video images. Vehicle motion data determined by visual odometry can be determined with respect to three-dimensional (3D) location measured as x, y, and z coordinates relative to a global coordinate system, for example latitude, longitude, and altitude. Vehicle motion data can also determine vehicle 3D orientation as angles roll, pitch, and yaw, measured as rotations about x, y, and z axes. These six coordinates specify the six-axis pose of an object in 3D space.

Figure 3:
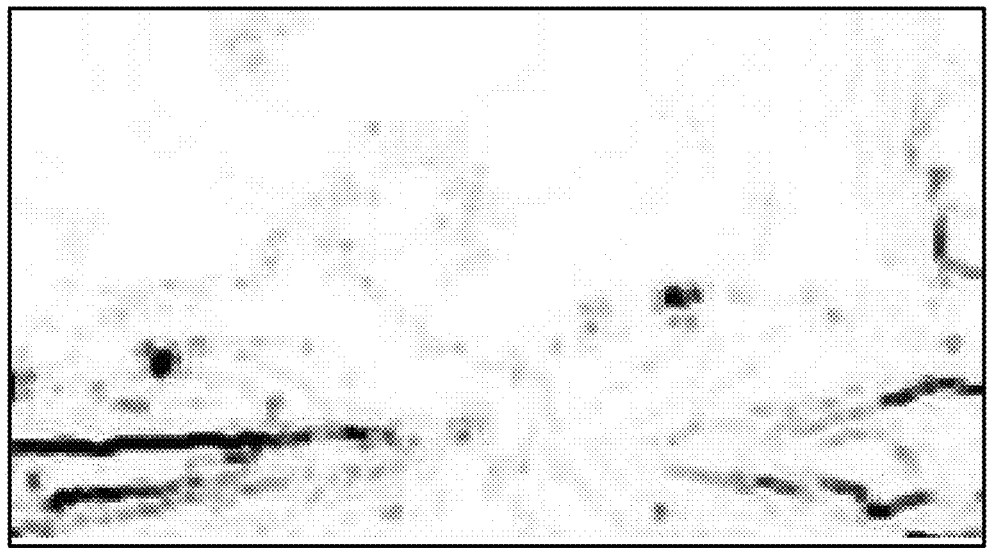
FIG. 3 is a diagram of an example optical flow image.

FIG. 3 is a diagram of an example optical flow image 300 rendered in black and white to comply with Patent Office regulations. Optical flow image 300 includes image data determined by calculating optical flow, which measures the change in image pixel location data between two or more RGB video images 200. Optical flow calculations are performed by locating image features in a first video image 200 and comparing the locations with locations of corresponding image features in a second video image 200. The change in image feature locations between two video images 200 is a function of the change in six-axis pose (location and orientation) of the video camera between acquisitions of the video images 200 and the location of the image feature in the real world environment.

An image feature can be any arrangement of pixel data that can be reliably determined in the two or more video images 200. Put another way, an image feature can be any arrangement of pixel values that can be located in two or more video images 200. For example, edges produced by changes in pixel values can be used to identify an image feature. Optical flow image 300 is an example of dense optical flow imaging and corresponds to differences between locations of image features in first and second video images 200 for a plurality of regions. Optical flow is defined as the apparent motion of features in a visual scene including surfaces, edges, and objects caused by relative motion between an observer or a sensor acquiring images of the visual scene and the visual scene. Dense optical flow imaging is defined as optical flow imaging that determines optical flow values for most (>80%) of the pixel locations in an image. This is contrasted with sparse optical flow imaging where optical flow values for only a small (<100) number of pixel locations is determined.

One technique for determining image feature locations is to select a contiguous region of pixels having a first location in a first video image 200 and use the region as a kernel to determine a second location with the highest correlation coefficient in a second video image 200. The second location with the highest correlation coefficient in the second image will correspond to the first location. Determination of optical flow depends upon selecting image regions that do not substantially change appearance from a first video image 200 to a second video image 200 but do change location due to movement of the video sensor between first and second video images 200. The time between acquiring first and second video images can be selected to minimize changes in the appearance of image regions due to changes in perspective and occlusion while maximizing changes in region location due to video sensor movement. The time step between acquiring the pair of first and second video images can be from one to a small number (<10) of video frames, where a video frame time step is the length of time required to acquire a single video image.

Video sensor movement based on an optical flow image 300 can be determined by simultaneous solution of motion equations based on the 3D locations of points in the real world environment imaged by the video sensor and the six-axis movement of the video sensor between video images 200. Because the 3D locations of the points in the real world do not change, the only variable is the motion of the video sensor and can therefore be determined by simultaneous solution of the linear equations that determine the locations in the video images 200 that correspond to points in the real world environment based on the magnification of the lens included in the video sensor. Techniques described herein train a deep neural network (DNN) to perform calculations equivalent to simultaneous solution of linear equations to produce location (x, y, and z) and orientation (roll, pitch, and yaw) parameters corresponding to six-axis video sensor motion. One issue with determination of six-axis sensor motion based on an optical flow image 300 is the large amount of computation required to determine an optical flow image 300. Techniques described herein improve six-axis video sensor motion determination by using eccentricity calculations as described below in relation to FIG. 4 to replace optical flow calculations and thereby reducing the number of calculations required to determine six-axis video sensor motion. Replacing optical flow calculations with eccentricity calculations can decrease the time required to perform the calculations by a factor of greater than 1000, thereby speeding up the calculations without decreasing the accuracy of the determined six-axis sensor motion. Dense optical flow images or maps can be calculated by a number of different techniques including phase correlation, differential techniques, or linear programming. What these techniques have in common is a large number of calculations for each pixel of input image data including in some examples Fourier transforms (phase correlation techniques) or iterative calculations (linear programming) that require a large number of calculations. Eccentricity maps as described in relation to FIG. 4 require a small, fixed number of per-pixel calculations that do not depend upon the amount of change in the input image data.

Figure 4:
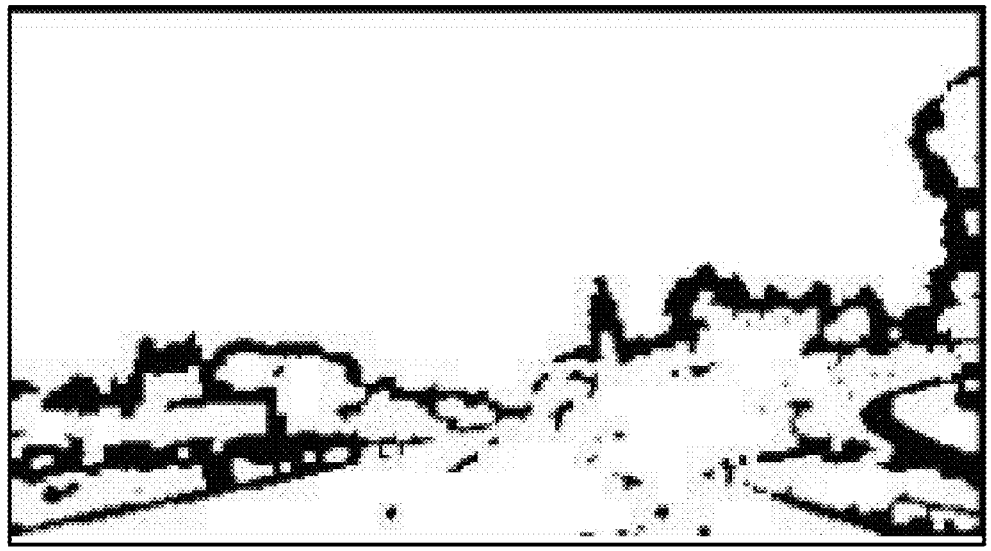
FIG. 4 is a diagram of an example eccentricity map.

FIG. 4 is an example eccentricity map 400 rendered in black and white to comply with Patent Office regulations. In addition, we note that the background of eccentricity map 400 is rendered as white, which usually denotes high eccentricity values, rather than black, which usually denotes low eccentricity values to improve legibility. Eccentricity map 400 is output by an eccentricity process described by equations (1)-(5) (below) in response to input video stream data. Prior to calculating an eccentricity map 400, pixel data can be transformed from a multiple value format like red-green-blue (RGB) encoding where each pixel can include three eight-bit values corresponding to red, green and blue video channels into a single eight-bit grayscale value, for example.

Eccentricity is a measure of the amount of change in value of pixels in a video stream data, where video stream data includes a plurality of frames of video data acquired at equal time intervals. Eccentricity processing calculates a per-pixel normalized eccentricity $\varepsilon_k$ for a video frame (time) k of video stream data based on determining per-pixel mean and variance for video stream data and comparing a pixel's current value to the mean value for that pixel including variance. Eccentricity $\varepsilon_k$ can determine pixels corresponding to changes in a video stream data by determining foreground and background pixels based on a pixel's eccentricity $\varepsilon_k$ value. Eccentricity $\varepsilon_k$ tends to be small (near $\alpha$) for pixels that do not change values over time, from video frame to video frame, i.e. background pixels. Eccentricity $\varepsilon_k$ tends to approach a value of one for pixels that change values over time, i.e. foreground pixels. Foreground pixels correspond to pixels that are changing as a result of video sensor motion. At time k, a per-pixel mean $\mu_k$ for pixel value samples up to time k can be calculated by equation (1):

$$\mu_k = (1-\alpha)\mu_{k-1} + \alpha x_k \quad (1)$$

where $x_k$ is the pixel value at time k and $\alpha$ is an exponential decay factor with a value near but not equal to zero and corresponds to a "forgetting factor" which decreases the effect of video data on eccentricity $\varepsilon_k$ as distance from time k increases, having the effect of a finite window of video frames that updates each frame. The constant $\alpha$ can be determined by user input. Per-pixel variance $\sigma_k^2$ for samples up to time k can be calculated by equations (2) and (3) using a temporary variable $d_k^2$:

$$d_k^2 = (x_k - \mu_k)^T(x_k - \mu_k) = \|x_k - \mu_k\|^2 \quad (2)$$

$$\sigma_k^2 = (1-\alpha)\sigma_{k-1}^2 + \frac{\alpha}{(1-\alpha)}d_k^2 \quad (3)$$

Per-pixel mean $\mu_k$ and variance $\sigma_k^2$ can be combined to calculate eccentricity $\varepsilon_k$:

$$\varepsilon_k = \alpha\left(1 + \frac{\|x_k - \mu_k\|^2}{\max[\gamma, \sigma_k^2]}\right) \quad (4)$$

where max $[\gamma, \sigma_k^2]$ is a function that selects the maximum between variance $\sigma_k^2$ and a constant $\gamma$, which can be determined by user input to avoid numerical instability when $\sigma_k^2$ is near zero. Normalized eccentricity $\varepsilon_{k_{norm}}$ can be calculated by equation (5), which normalizes eccentricity $\varepsilon_{k_{norm}}$ to assume values in the range (0,1):

$$\varepsilon_{k_{norm}} = \frac{\alpha}{(1-\alpha)}\left(\frac{\|x_k - \mu_k\|^2}{\max[\gamma, \sigma_k^2]}\right) \quad (5)$$

An eccentricity map 400 based on normalized eccentricity $\varepsilon_{k_{norm}}$ can be used to determine changes in video image 200 pixel data similar to an optical flow image 300. Pixel values in an eccentricity map 400 are proportional to the current pixel value and its mean, normalized by a thresholded variance. Because the 3D locations of the real world locations that are imaged by the video sensor are assumed not to change over the time period in which the video stream data is acquired, eccentricity map 400 pixel values are changing due to six-axis motion of a video sensor. The eccentricity map 400 pixel values therefore are a non-linear mapping of the six-axis motion of the sensor. Techniques described herein concatenate an eccentricity map 400 with a pair of RGB video images 200 an input them into a DNN trained as described below in relation to FIG. 5 to produce six-axis video sensor motion data. The pair of RGB video images 200 are acquired from the video stream data that produced the eccentricity map 400, wherein the time step between acquiring the pair of RGB video images 200 occurs during the time period in which the eccentricity map 400 is calculated.

Figure 5:
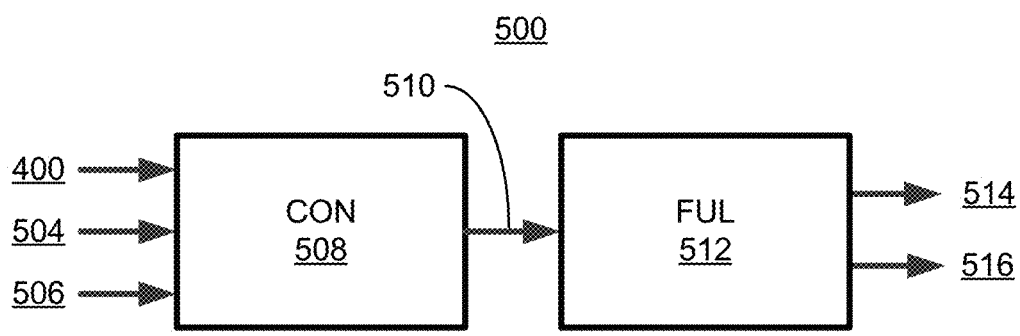
FIG. 5 is a diagram of an example deep neural network (DNN).

FIG. 5 is a diagram of a DNN 500 that can be trained to output six-axis video sensor motion including location 514 and orientation 516 based on inputting an eccentricity map 400, a first video image 504 and a second video image 506 into convolutional layers (CON) 508. Because the video sensor is attached to a vehicle 110, the determined six-axis sensor motion also determines the six-axis motion of the vehicle 110. Determined six-axis motion of a vehicle 110 can be used to determine the location, speed and direction of the vehicle 110 with respect to the external environment of the vehicle 110, included a roadway, for example. Determined location, speed and direction of the vehicle 110 can be used by a computing device 115 included in a vehicle to determine a starting position and direction for a vehicle path. A vehicle path can be determined by the computing device 115 and can be used by the computing device to direct the motion of the vehicle 110 by controlling vehicle powertrain, steering and brakes to operate the vehicle along the vehicle path. An eccentricity map 400, a first video image 504 and a second video image 506 can be concatenated or stacked as channels to be input in parallel into convolutional layers 508. Convolutional layers 508 include a plurality of convolutional processing elements that can process input eccentricity map 400, first video image 504, and second video image 506, to form hidden variables 510 that are passed to fully connected layers (FUL) 512. Fully connected layers 512 include two separate data paths that input hidden variables 512 and produce location 514 and orientation 516 output, where location 514 includes x, y, and z coordinates and orientation 516 includes roll, pitch, and yaw rotations about the x, y, and z axes. Location 514 and orientation 516 specify the six-axis motion of the video sensor that acquired input first video image 504 and second video image 506 based on pixel data in eccentricity map 400. Because the video sensor is assumed to be rigidly fixed to the vehicle 110, determined six-axis motion of the video sensor can be assumed to apply to the vehicle 110 and therefore determine six-axis vehicle motion data.

DNN 500 can be trained by acquiring a plurality of first and second video images 504, 506 along with corresponding eccentricity maps 400. Ground truth corresponding to the first and second video images 504, 506 can be determined based on optical flow images 300. Six axis motion of the video sensor can be determined by simultaneous solution of linear equations relating to the optical flow images 300 as discussed above in relation to FIG. 3. Ground truth refers to output data determined independently from the output of DNN 500. Ground truth data for training DNN 500 can also be obtained by instrumenting a video sensor with a six-axis accelerometer that measures accelerations is each of the six axes independently. Recorded six-axis acceleration data can be integrated to determine displacements in x, y, and z and rotations about each of the x, y, and z axes. The ground truth data can be compared to back-propagated output data to determine a loss function that can be used to train the DNN 500. By acquiring ground truth six-axis motion data in global coordinates, DNN 500 can be trained to output six-axis motion data in global coordinates relative to the location and orientation of the video sensor at the time the first video image 502 is acquired.

Figure 6:
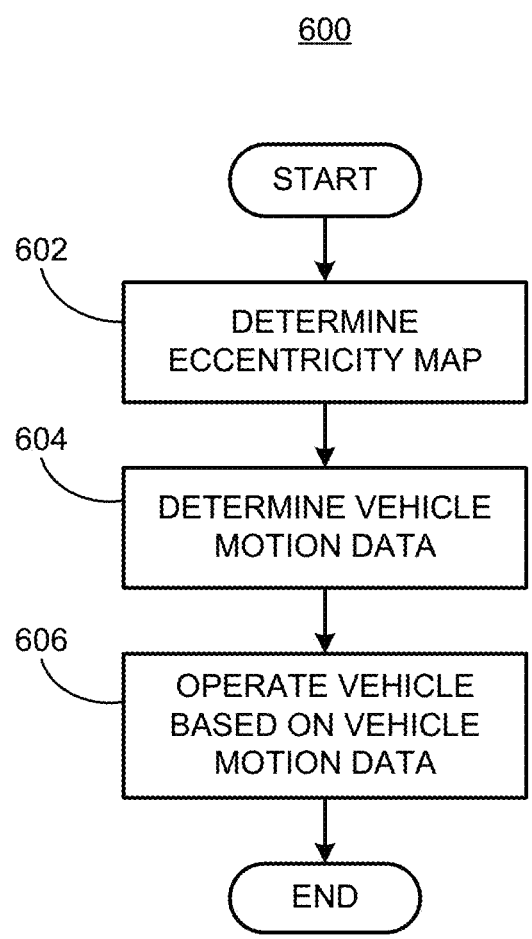
FIG. 6 is a flowchart diagram of a process to operate a vehicle based on visual odometry.

FIG. 6 is a diagram of a flowchart, described in relation to FIGS. 1-5, of a process 600 for operating a vehicle based on vehicle motion data. Process 600 can be implemented by a processor of computing device, taking as input information from sensors, and executing commands, and outputting object information, for example. Process 600 includes multiple blocks that can be executed in the illustrated order. Process 600 could alternatively or additionally include fewer blocks or can include the blocks executed in different orders.

Process 600 begins at block 602, where a computing device determines an eccentricity map 400 based on video stream data as discussed above in relation to FIG. 4. The video stream data can be acquired by a video sensor or camera included in a vehicle 110. The video stream data can include a first video image 502 and a second video image 504.

At block 604 a computing device 115 can input the eccentricity map 400, the first video image 502 and the second video image 504 into a trained DNN to determine six-axis video sensor motion. The DNN is trained according to techniques discussed above in relation to FIG. 5 to determine the six-axis sensor motion data.

At block 606 a computing device can operate a vehicle 110 based on the six-axis video sensor motion data output at block 604. Because the video sensor is attached to the vehicle, 110 six-axis video sensor motion data can be assumed to apply to the vehicle as vehicle motion data. The vehicle motion data can be used by computing device 115 to determine a location, speed and direction for the vehicle 110, for example. The location, speed, and direction of the vehicle 110 can be used to determine a starting location for a vehicle path that can be used to operate a vehicle 110 as it travels on a roadway, for example. The computing device 115 can control vehicle 110 powertrain, steering and brakes via controllers 112, 113, 114 to cause vehicle to travel along the predicted vehicle path. The computing device 115 can determine updated vehicle motion data as the vehicle 110 travels along the vehicle path to determine whether the vehicle path is being followed accurately, for example. Following block 610 process 600 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A computer, comprising a processor; and
a memory, the memory including instructions to be executed by the processor to:
determine an eccentricity map determined by subtracting a per-pixel mean from pixels of a video image to determine a result and dividing the result by a per-pixel variance wherein the per-pixel mean and the per-pixel variance are determined based on video image data acquired from a vehicle video sensor;
determine vehicle motion data by inputting the eccentricity map and two red, green, blue (RGB) video images to a deep neural network trained to output vehicle motion data including location, speed, and direction in global coordinates; and
operate a vehicle based on the vehicle motion data.

2. The computer of claim 1, wherein the two RGB video images are acquired at a time step, where the time step corresponds to a small number of video frames.

3. The computer of claim 1, wherein vehicle motion data includes vehicle location, speed and direction with respect to an external environment of the vehicle.

4. The computer of claim 1, the instructions further including instructions to determine the eccentricity map based on an exponential decay factor α, wherein the eccentricity map measures the motion of objects, edges and surfaces in video stream data.

5. The computer of claim 1, the instructions further including instructions to concatenate the eccentricity map with the two RGB images as input channels to the deep neural network.

6. The computer of claim 5, the instructions further including instructions to process the concatenated eccentricity map and two RGB images using a plurality of convolutional layers to generate hidden variables corresponding to vehicle motion data.

7. The computer of claim 6, the instructions further including instructions to process the hidden variables corresponding to vehicle motion data with a plurality of fully connected layers to generate x, y, and z location coordinates and roll, pitch, and yaw rotational coordinates.

8. The computer of claim 1, the instructions further including instructions to train the deep neural network based on a training dataset including eccentricity maps, RGB images and vehicle motion ground truth in global coordinates.

9. The computer of claim 8, wherein vehicle motion ground truth is generated based on processing dense optical flow images and corresponding RGB image pairs.

10. The computer of claim 1, the instructions further including instructions to acquire the RGB video images from a vehicle video sensor.

11. A method, comprising:
determining an eccentricity map determined by subtracting a per-pixel mean from pixels of a video image to determine a result and dividing the result by a per-pixel variance wherein the per-pixel mean and the per-pixel variance are determined based on video image data acquired from a vehicle video sensor;
determining vehicle motion data by inputting the eccentricity map and two red, green, blue (RGB) video images with a deep neural network trained to output vehicle motion data including location, speed, and direction in global coordinates; and
operating a vehicle based on the vehicle motion data.

12. The method of claim 11, wherein the two RGB video images are acquired at a time step, where the time step is a small number of video frames.

13. The method of claim 11, wherein vehicle motion data includes vehicle location, speed and direction with respect to an external environment of the vehicle.

14. The method of claim 11, further comprising determining an eccentricity map based on an exponential decay factor α, wherein the eccentricity map measures the motion of objects, edges and surfaces in video stream data.

15. The method of claim 11, further comprising concatenating the eccentricity map with the two RGB images as input channels to the deep neural network.

16. The method of claim 15, further comprising processing the concatenated eccentricity map and two RGB images using a plurality of convolutional layers to generate hidden variables corresponding to vehicle motion data.

17. The method of claim 16, further comprising processing the hidden variables corresponding to vehicle motion data with a plurality of fully connected layers to generate x, y, and z location coordinates and roll, pitch, and yaw rotational coordinates.

18. The method of claim 11, further comprising training the deep neural network based on a training dataset including eccentricity maps, RGB images and vehicle motion ground truth in global coordinates.

19. The method of claim 18, wherein vehicle motion ground truth is generated based on processing dense optical flow images and corresponding RGB image pairs.

20. The method of claim 11, further comprising acquiring the RGB video images from a vehicle video sensor.

* * * * *